United States Patent [19]

Miksitz

[11] 4,061,246
[45] Dec. 6, 1977

[54] CONTROLLED FEEDING OF POWDERS TO CONVEYING SYSTEMS AND PROCESS

[75] Inventor: Frank J. Miksitz, Phillipsburg, N.J.

[73] Assignee: UFI Engineering & Manufacturing Co., Inc., Bethlehem, Pa.

[21] Appl. No.: 596,430

[22] Filed: July 16, 1975

Related U.S. Application Data

[63] Continuation-in-part of Ser. No. 563,453, March 31, 1975, Pat. No. 4,015,747, which is a continuation-in-part of Ser. No. 467,558, May 6, 1974, Pat. No. 3,874,566, which is a continuation-in-part of Ser. No. 216,105, Jan. 7, 1972, Pat. No. 3,809,286.

[51] Int. Cl.$^2$ .............................. B65G 65/34
[52] U.S. Cl. .................... 222/1; 222/195; 222/404; 222/564
[58] Field of Search ............ 222/193, 263, 1, 237, 222/411, 404, 195, 564; 302/53, 56; 214/17 DA

[56] References Cited

U.S. PATENT DOCUMENTS

| | | | |
|---|---|---|---|
| 2,011,133 | 8/1935 | Yoss | 222/263 X |
| 2,668,388 | 2/1954 | Thompson | 222/195 X |
| 2,792,262 | 5/1957 | Hathorn | 302/53 |
| 3,050,201 | 8/1962 | Humphrey | 214/17 DA |
| 3,540,633 | 11/1970 | Eckhardt | 222/195 |

Primary Examiner—Robert B. Reeves
Assistant Examiner—John P. Shannon
Attorney, Agent, or Firm—Cushman, Darby & Cushman

[57] ABSTRACT

A method and apparatus for the controlled feeding of finely divided powdered material from a bin or the like by gravity assist through a mechanical feeding device are characterized by fluidizing or at least aerating the powder above the feed device in a manner to promote flow and prevent packing of the bed of material above the feed device while maintaining a stable unfluidized mass of powder at the feed device.

The system is particularly useful in the controlled feeding of finely divided powdered material from a closed bin or the like into a pneumatic conveying conduit by gravity assist through a mechanical feeding device and characterized by constantly equalizing the pressure in the bin to pneumatic conveying line pressure for the purpose of equalizing the pressure in the pore and void space in the bed of material while maintaining a stable unfluidized mass of powder at the feed device.

9 Claims, 3 Drawing Figures

CONTROLLED FEEDING OF POWDERS TO CONVEYING SYSTEMS AND PROCESS

RELATED APPLICATIONS

This is a continuation-in-part of application Ser. No. 563,453, now U.S. Pat. No. 4,015,747 filed Mar. 31, 1975 as a continuation-in-part of application Ser. No. 467,558, now U.S. Pat. No. 3,874,566, filed May 6, 1974 as a continuation-in-part of Ser. No. 216,105, filed Jan. 7, 1972, now U.S. Pat. No. 3,809,286. The subject matter of said applications is incorporated herein by reference.

This invention relates to methods and apparatus for effecting gravity assisted flow of powdered material and, in particular, to methods and apparatus for the controlled feed of such material from an upper zone into a lower zone.

The prior applications disclose methods and apparatus in which the feeding or discharging of granular material from a bin or the like is effected and closely controlled by a special arrangement of a centrally apertured horizontal feed plate disposed just above an aperture in a fixed bottom wall of the bin and below a fixed shroud or baffle located within the mass of material. The construction and disposition of the shroud relative to the bottom wall and to the plate is such that the granular material does not flow spontaneously by gravity through the apertured feed plate when the latter is stationary. Thereafter, the plate is driven in an orbital path about a vertical axis with the result that granular material residing on the peripheral portion of the plate is carried inwardly with respect to the vertical axis of the shroud. The overall result is that granular material is continuously fed downwardly through the feed plate along a path which moves in a circle, the flow of material being proportional to the speed of the plate.

In the preferred construction the aperture in the bottom wall of the bin is smaller than the aperture in the feed plate. With this arrangement an annular portion of the inwardly moving granular material resides temporarily on bottom wall of the bin adjacent the aperture in the bottom wall. The orbital movement of the feed plate continuously pushes the material into the aperture along a path which moves around the periphery of the aperture. The feed plate may be larger or smaller in diameter than the shroud. The orbital movement of the plate may be reversed periodically and may include rolling movement about its own axis.

SUMMARY OF THE INVENTION

The present invention is directed to the feeding of those finely divided particulate materials, hereinafter referred to as powder, which may become so flowable under the feeding conditions that they may flush through the feed device. The feed device in this sense may be any of a variety of different devices and in its broadest form the invention is not limited to the orbital feed plate technique summarized above. However, the orbital feed plate is critical to those systems in which the powder tends to form an arch over the discharge opening or to present other problems which adversely affect the operation of conventional mechanical feed devices.

An unwanted flushing condition may arise for example, if a portion of the powder is aerated in the bin in a known manner to prevent packing; under these conditions the aerated portion may become fluidized in the vicinity of the feed device so that the latter can exert little or no control over the flow rate out of the bin. If the aeration device is modified in structure or position to avoid fluidization at the feed device, the powder at the feed device may become consolidated by the weight of the powder above the feed device and thereby tend to form a plug or an arch. The orbital feed plate must be employed under these conditions.

The control problem is particularly severe in feeding powders from a bin into a pneumatic conveyor system, that is into a conduit through which a stream of conveying gas is flowing. The gas pressure in the conduit inherently undergoes fluctuations due to the conveying action downstream of the point of entry of the powder into the conduit. These pressure fluctuations can be transmitted through the feed device so as to vary the compaction of the powder at or near the feed device to such an extent that uncontrollable variations occur in the rate at which the powder is fed by the feed device. In a severe situation the powder at or near the feed device may become fluidized and flush through the feed device.

The invention will be further understood from the following description of several illustrative embodiments taken with the drawings in which.

Figure 1:
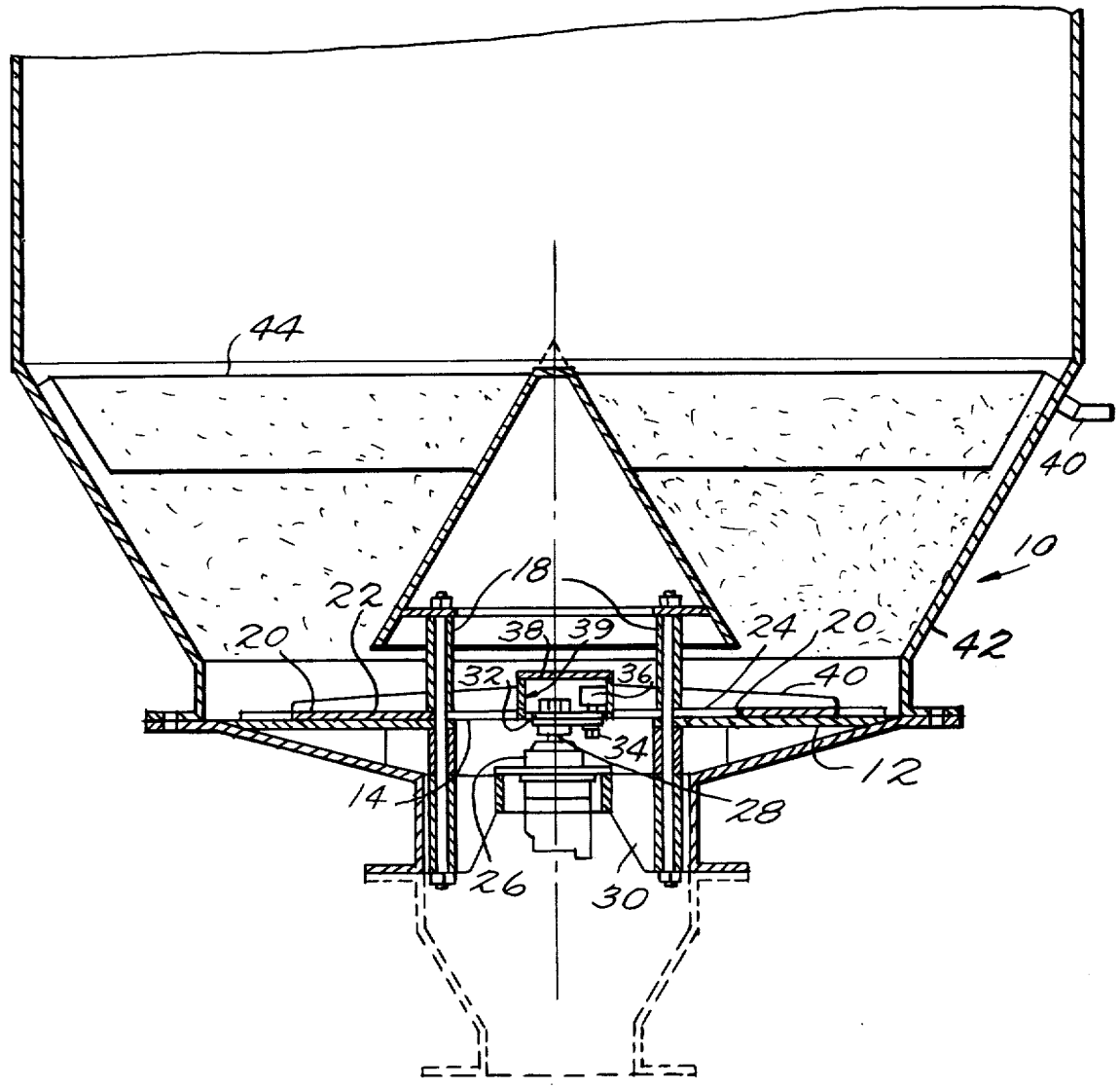
FIG. 1 is a schematic sectional view of a feed apparatus embodying the principles of the present invention.

In FIG. 1 there is shown a vessel 10 or bin having a horizontal bottom wall 12 which is provided with a circular feed aperture 14. Disposed within the mass of powder in the vessel 10 is a fixed conical shroud 16 which is supported by post members 18 in a position in which the axes of the feed aperture 14 and the shroud 16 coincide. Between the shroud 16 and the feed aperture 14 is an annular feed plate 20 which rides on the upper surface of the bottom wall 12. The aperture 22 in the feed plate 20 is larger than the aperture 14 in the bottom wall 12 so that the latter provides a shelf 24 over which powder will be urged by the feed plate 20.

The feed plate 20 is driven in an orbital path about the axis of the aperture 14 in the bottom wall 12 by any suitable drive mechanism. As shown there is provided a motor 26 having a rotary output shaft 28 coaxial with the aperture 14 in bottom wall 12. The motor is fixed with respect to the vessel by suitable mounting structure 30. A horizontal crank arm 32 is fixed to the motor shaft 28 and carries at its outer end a fixed stub shaft 34 which is parallel to the motor shaft 28. The stub shaft 34 fits into a cam-follower type bearing 36 which is in rolling contact with the inside diameter of ring 39 which is attached to spoke-like reinforcing member 40 fixed to feed plate 20 in a position such that the axis of the ring 39 coincides with the axis of the aperture 22 in the feed plate 20. The feed plate is gyrated by an eccentric cam-follower bearing 36 whose outermost edge describes a circle larger in diameter than the diameter of ring 39. The ratio of the diameter of the large circle to the diameter of ring 39 can be adjusted to any desired gyratory displacement of the feed plate. A cover 38 overlies the bearing 36 and the crank arm 32 and is fixed to spoke-like reinforcing members 40 which form part of the feed plate 20.

Surrounding the upper end of the shroud 16 and supported on the side wall 42 of the vessel 10 is a ring-shaped porous aeration curtain or pad 44 with open bottom to prevent accumulation of back-sifted material. An air line 46 is connected to the interior of the pad 44 for supplying air under pressure. When air is injected it flows into the powder along the entire circumference of the pad 44 and the powder above the pad 44 becomes agitated or fluidized. However, the smaller mass of powder below the pad 44 remains stable in the sense that it is not fluidized but rather is in the form of a plug. The orbiting feed plate 20 is therefore free to act on the plug of powder and urge it over the edge of the shelf 24 into the aperture 14, along a path which travels around the periphery of the aperture 14. As powder is fed out through the apertures 14 and 22 more powder enters from the agitated upper portion of the powder and becomes stable. The stable plug of powder prevents flushing of the entire mass of powder through the apertures 14 and 22 a condition which might arise from the weight of powder in the vessel 10 pressing down on the powder adjacent the feed plate 20 and from the flowable nature of some powders. If desired the feed plate 20 may be shaped to provide an annular dam around the aperture 22 so that the powder must flow upwardly before passing through the aperture 22. This also aids in preventing flushing. During operation the level of powder in the vessel can drop below the level of the shroud 16 without affecting operation of the feeder.

The plug reforms automatically during refilling.

Figure 2:
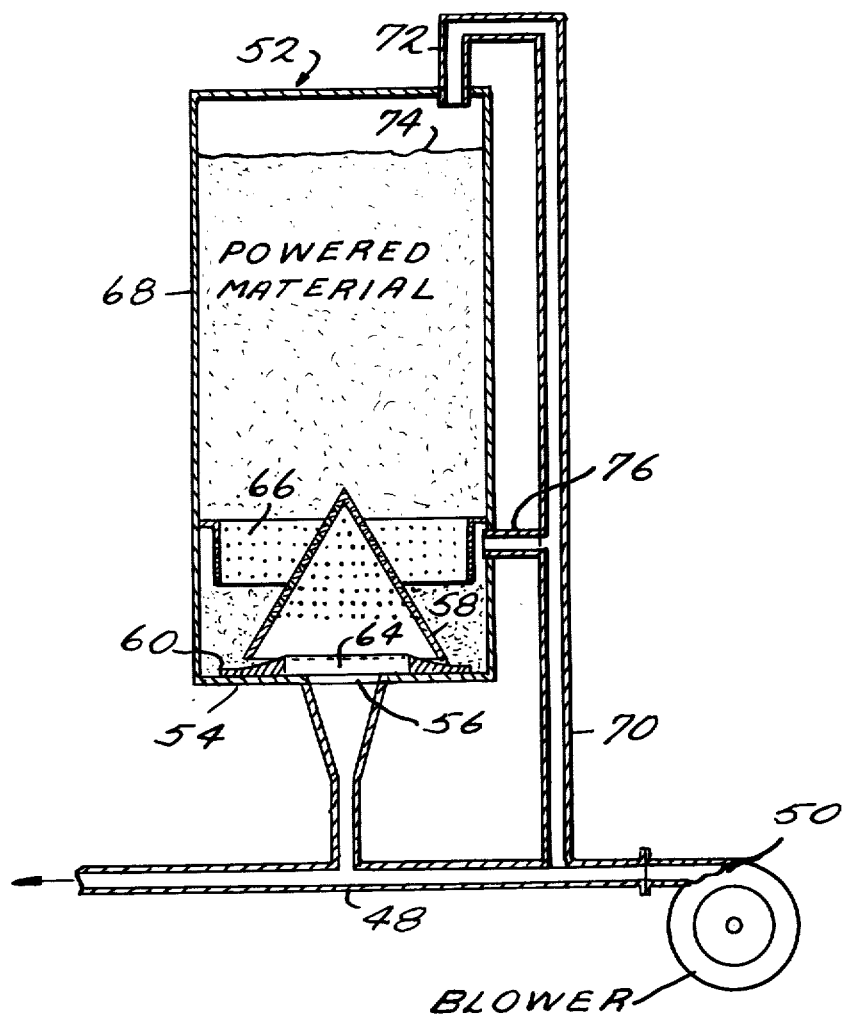
FIG. 2 is a schematic sectional view of a feed apparatus embodying the principles of the present invention, in combination with a pneumatic conveyor conduit.

FIG. 2 illustrates a system for feeding powder into a pneumatic conveyor conduit 48 which receives a stream of compressed air from a blower 50. The system includes a closed vessel 52 having a horizontal bottom wall 54 provided with a feed aperture 56 which is in communication with the conveyor conduit 48. A porous or finely perforated shroud 58 is positioned above the aperture 56 and an annular orbiting feed plate 60 resides on the upper surface of the bottom wall 54. The support for the shroud 58 and the orbital drive for the feed plate 60 have been omitted in the interest of simplicity. The feed plate 60 in this embodiment is shaped to provide a generally frusto-conical upper surface 62. The central aperture 64 in the feed plate 60 in this embodiment is always larger in diameter than the aperture 56 in the bottom wall.

Surrounding the upper end of the shroud 58 is a perforated annular curtain 66 supported by and slightly spaced from the side wall 68 of the vessel 52. A line 70 extends from the conveyor conduit 48 at a location upstream of the point of entry of the powder into the conduit 48. This line 70 has one branch 72 connecting with the vessel 52 at a location above the level 74 of the powder therein. Another branch 76 connects with the annular space between the curtain 66 and the vessel side wall 68.

In operation of this system pressure fluctuations in the conveyor conduit 48, which are inherent in such conduits, are equalized throughout the powder in the vessel 52 by way of branch 72. Air cannot pass downwardly through the powder because the bed becomes compacted and resists passage of the air. However, air can pass upwardly through the powder. Should this occur the powder might become fluidized adjacent the feed plate 60 and would then tend to flush through the apertures 64 and 56. The porous shroud 58 can pass air up into the powder and this in combination with the pressure equalization branch prevents flushing. The pores in the shroud 58 are selected to prevent back-sifting of powder.

For larger systems when the blower is started the porosity of the shroud 58 may not be sufficient to pass enough air to quickly equalize the pore and void pressure in the bin material to the pressure in the conduit 48, and some of the air may be forced to pass under the shroud 58 and some small amount of flushing could occur. To prevent this from happening the porous curtain 66 is installed on the periphery of the bin above the lower edge of the shroud 58 and is connected to the conveyor conduit 48 by the branch 76 so that the total porosity of the curtain 66 and the shroud 58 will handle the flow of pressure equalizing air. The bottom of the curtain is open to allow any back-sifted material to drop down to the bottom and be removed by the feeder when it is running.

When one starts feeding material into the pneumatic conveying system with the feeder the back pressure in the conduit 48 increases because of the friction and inertia force of material being conveyed. The pore/void pressure in the powder quickly adjusts to increased conduit pressure and the equalizing air flow passes through the porous shroud 58 and curtain 66 and equalizing line 72. Any fluctuation or change in feed or change in blower pressure will be reflected in the bed of powder. The powder adjacent to the bottom of the shroud 58 is now stable and quiescent, and the feed plate 60 can engage and feed the powder uniformly at all speeds without uncontrolled flushing.

Figure 3:
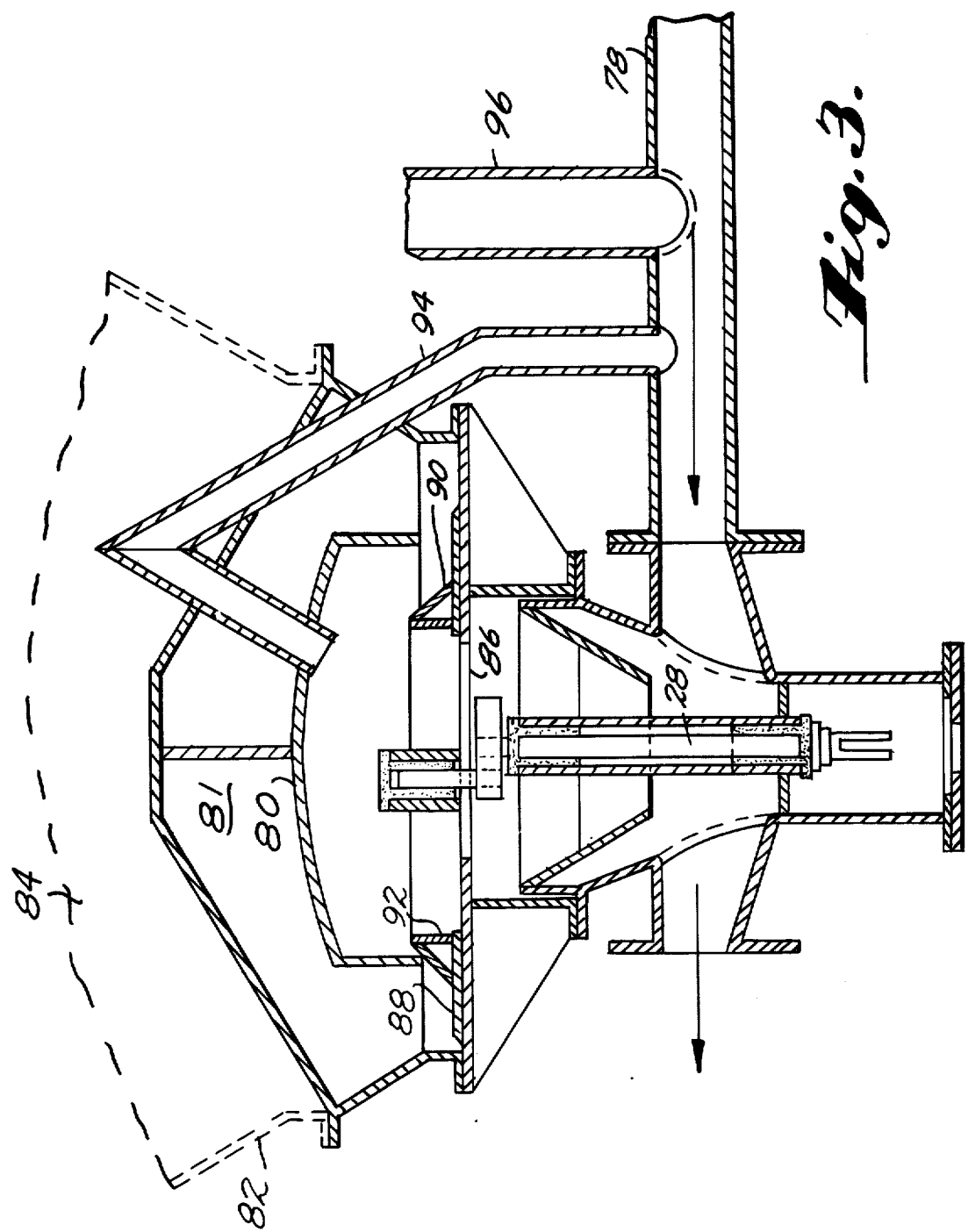
FIG. 3 is a schematic sectional view of a further form of feed device in combination with a pneumatic conveyor conduit.

FIG. 3 illustrates a further embodiment of a feed apparatus which is adapted for feeding powdered material into a pneumatic conveyor conduit 78. In this embodiment, the shroud 80 is shown as being supported from above by suitable brace members 81 and web rates attached to the side walls 82 of the bin 84. In feeding the pneumatic conveyor conduit 78 the powder which spontaneously flows inwardly under the shroud 80 may become aerated or partially fluidized by adventitious pressure fluctuations in the system; in such instance the aerated material might flow through the discharge aperture 86 at irregular or uncontrolled rates if not prevented from doing so. The feed plate 88 is constructed with an annular dam 90 which surrounds the feed aperture 92 and which is inclined downwardly and radially outwardly as shown. The upper edge of the dam 90 is above the lower edge of the shroud and thereby aids in blocking the spontaneous or uncontrolled flow of powdered material into the feed aperture 92. In some cases the dam may extend upwardly to a point below the lower edge of the shroud. In either case, upon orbital movement of the feed plate 88, the material will be urged over the dam 90 so as to pass through the apertures 92 and 86 into the pneumatic conveyor conduit 78 through which a stream of air is passing in a leftward direction.

The conveying air passing the point of discharge can cause a lowered pressure at that point due to a siphoning effect of the high velocity air stream. This may cause pressure disturbances near the feed plate 88 with resultant fluidization of the powder. To equalize pressure and prevent such pressure disturbances a conduit can connect the region under the shroud 80 to the pneumatic conveying line 78 in order to maintain the pressures about equal at these two locations. Such a pressure-equalization conduit should be constructed essentially vertically thereby avoiding horizontal sections where powder may tend to build up. As shown, a conduit 94 leads from the upstream portion of the conveyor conduit 78 into the area just below the upper end of the shroud 80. A second conduit 96 terminates in the top of the closed bin. A secondary benefit of the conduits 94 and 96 is momentary aeration caused by pressure fluctuations which would promote flow and minimize the possibility of hang-up material. The apparatus and methods described above can be employed in pneumatic conveying systems in which suction is applied to the downstream end of the conveyor tube and the upstream end of the conveyor tube is open to the "atmosphere." Pressure equalization lines are not required when feeding into a vacuum conveying system.

What is claimed is:

1. A method for feeding finely divided powdered material from a mass of the powder maintained in an upper zone downwardly into a lower zone by gravity assist through a feed device which mechanically urges a stream of the powder through a feed aperture at a controlled rate, said method comprising providing a shroud within the powder in the upper zone, disposing a horizontal annular plate below the shroud with powder in the form of an annular mass thereof residing on the upper surface of the plate, injecting a gas upwardly into the mass of material at a location above the shroud to agitate the powder to render it free flowing by gravity while maintaining at the annular plate a stable mass of the powder, and orbiting the plate in a horizontal plane thereby urging powder only from the stable mass thereof inwardly toward and through the aperture in the plate along a path which moves in a horizontal plane around the periphery of the aperture in the plate, whereby the injected gas does not cause uncontrollable delivery of fluidized powder to the plate and whereby the plate maintains control over the rate at which the powder flows through the feed aperture.

2. A method of feeding finely divided powdered material into a conveying conduit through which a stream of powder-transporting gas is flowing, the powder being maintained in a closed vessel having at its bottom a feed device which mechanically urges a stream of the powder downwardly through a feed aperture at a controlled rate into the conveying conduit, said method comprising providing a shroud within the powder in the vessel, disposing a horizontal annular plate below the shroud with powder in the form of an annular mass thereof residing on the upper surface of the plate, introducing gas from the conveying conduit at a location upstream of the entry of powder thereinto to the interior of said vessel at a first location above the annular plate and at a second location above the level of the powder in the vessel whereby pressure fluctuations in the conveyor conduit are equalized throughout essentially the entire mass of powder in the vessel and whereby a smaller mass of stable powder resides at the annular plate and orbiting the plate in horizontal plane thereby urging powder only from the stable mass thereof inwardly toward and through the aperture in the plate along a path which moves in a horizontal plane around the periphery of the aperture in the plate.

3. A method as in claim 2 wherein gas is introduced into the interior of the vessel at said first location through a porous annular curtain which is concentric with said feed device so that the gas is introduced along the circumference of the curtain.

4. Apparatus for feeding finely divided powdered material into a conveying conduit through which a stream of powder-transporting gas is flowing, said apparatus comprising a closed vessel containing a mass of the powder to be fed; a feed device at the bottom of the vessel for mechanically urging a stream of the powder downwardly through a feed aperture at a controlled rate into the conveying conduit; said feed device including a fixed shroud disposed within the powder in the vessel, a horizontal annular feed plate having an aperture therethrough located directly below the lower end of the shroud and means for orbiting said plate about the vertical axis of the fixed shroud so that powder is urged inwardly from the mass of powder and over the edge of the aperture in said annular plate along a path which continuously moves around the periphery of the aperture pressure equalization lines connecting the conveying conduit at a location upstream of the entry of powder thereinto to the interior of the vessel at a first location at said feed device and above the feed aperture and at a second location above the level of the powder in the vessel.

5. Apparatus as in claim 4 including an annular porous structure disposed around the upper end of said shroud at said first location for receiving gas from one of said pressure equalization lines and introducing the gas into the powder along the circumference of said porous structure.

6. A method for controllably feeding powder from a mass thereof maintained in an upper zone downwardly into a lower zone by gravity assist comprising: providing a shroud within the powder in the upper zone; injecting a gas upwardly into and through the mass of powder at a location above the lower end of the shroud to agitate the powder above said location and render it more flowable while maintaining a stable mass of powder below the shroud; providing a continuously open unobstructed feed aperture directly below the shroud in the stable mass of powder; and controllably agitating a portion of the stable mass of powder at the location of the feed aperture by orbiting in a horizontal plane a horizontal annular plate which is supported on a horizontal wall having an aperture in register with the aperture in the annular plate.

7. A method as in claim 6 wherein the aperture in the annular plate is of greater diameter than the aperture in the bottom wall.

8. Apparatus for controllably feeding powder from a mass thereof held in a container downwardly into a lower zone comprising: a shroud within the mass of powder; a controllable powder feeding device disposed directly below the shroud, said device including a horizontal annular plate having a central aperture supported on a bottom wall of the container, said bottom wall having an aperture in register with the aperture in said annular plate for passing agitated powder into said lower zone; and means located above the lower end of the shroud for injecting a gas stream upwardly into and through the mass of powder to agitate the powder above the lower end of the shroud thereby rendering it more flowable while maintaining a stable mass of powder at the location of said powderfeeding device, whereby as said feed device feeds powder to said lower zone additional powder flows from gas-agitated mass of powder into said stable mass of powder.

9. Apparatus as in claim 8 wherein the aperture in said annular plate is of greater diameter than the aperture in said bottom wall.

* * * * *